UNITED STATES PATENT OFFICE.

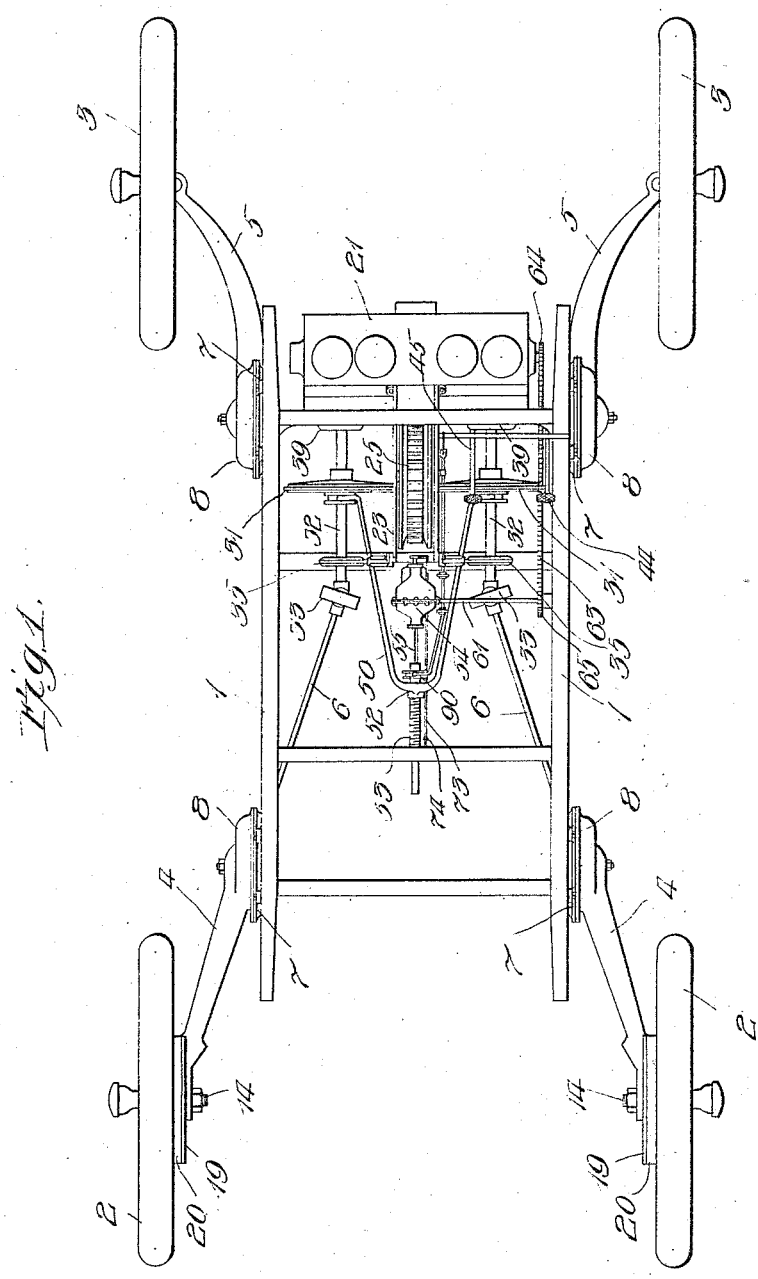

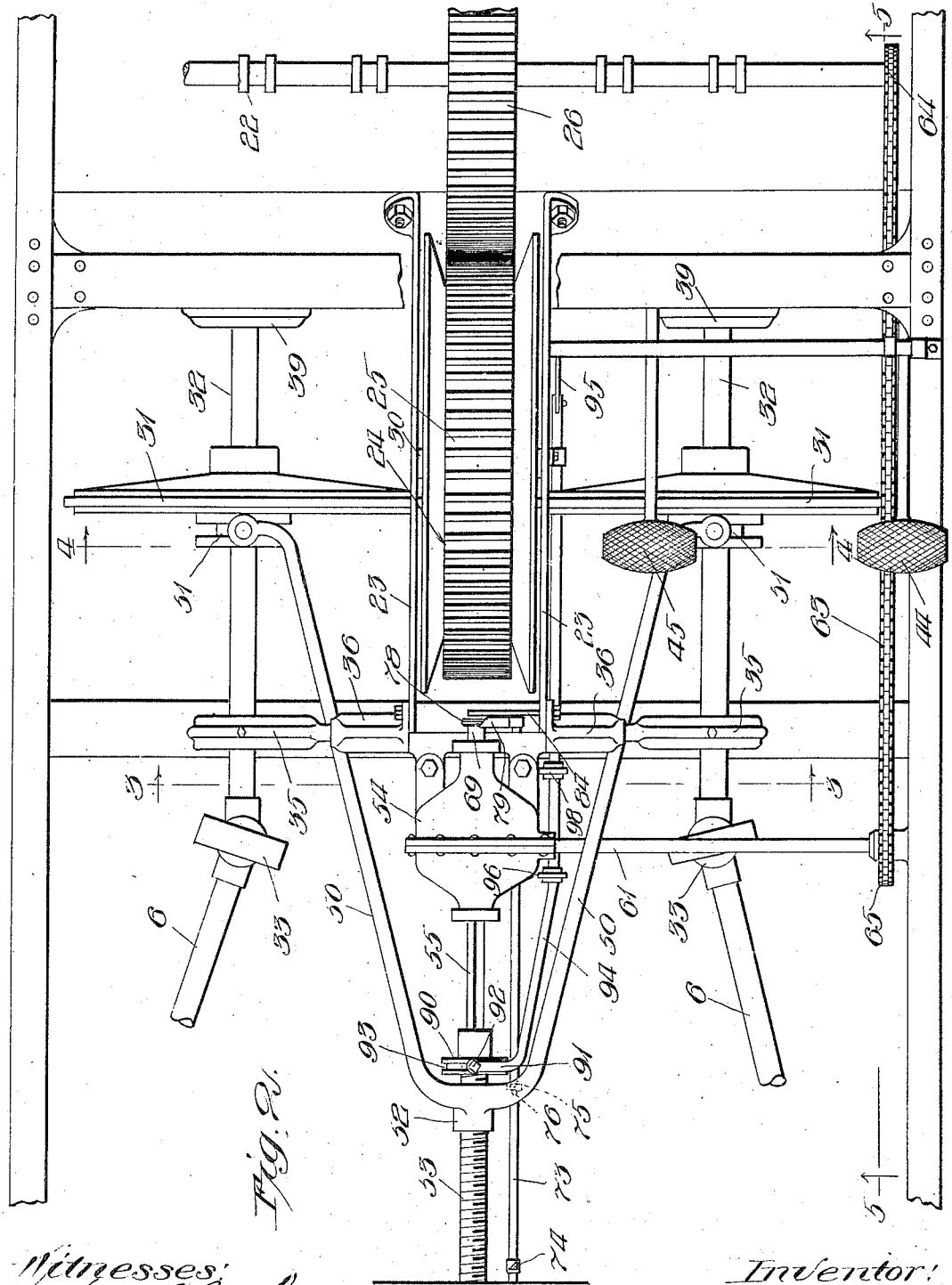

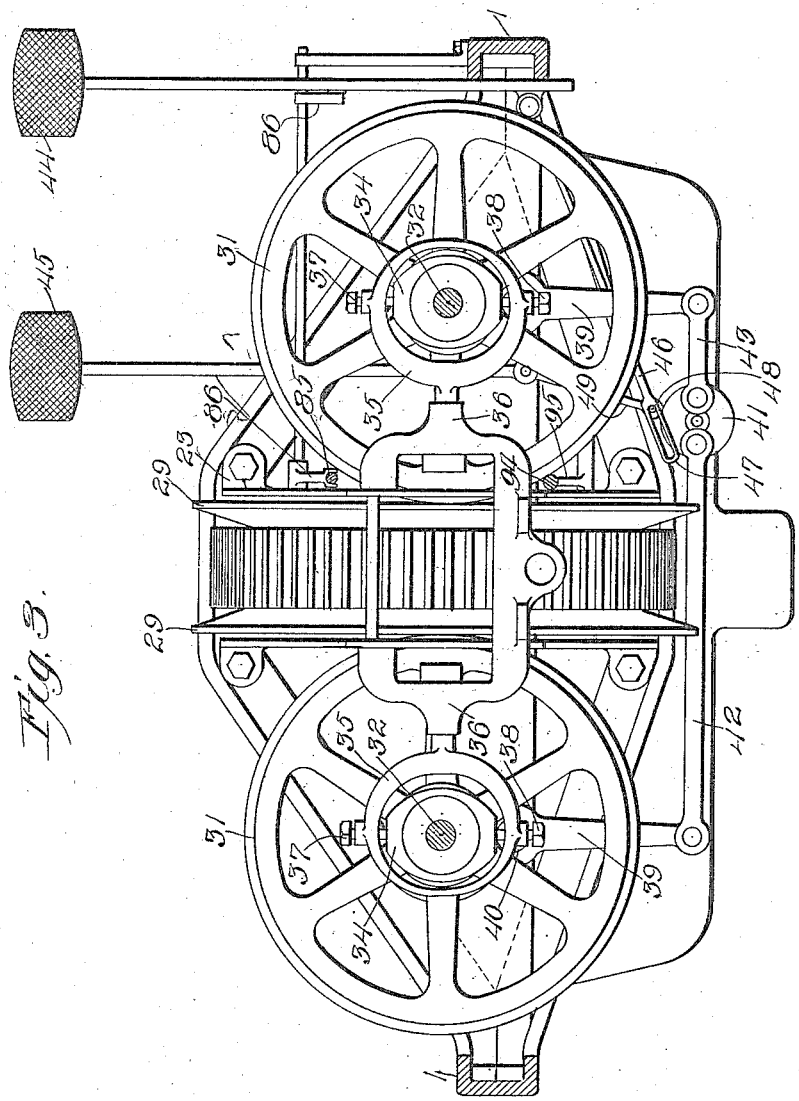

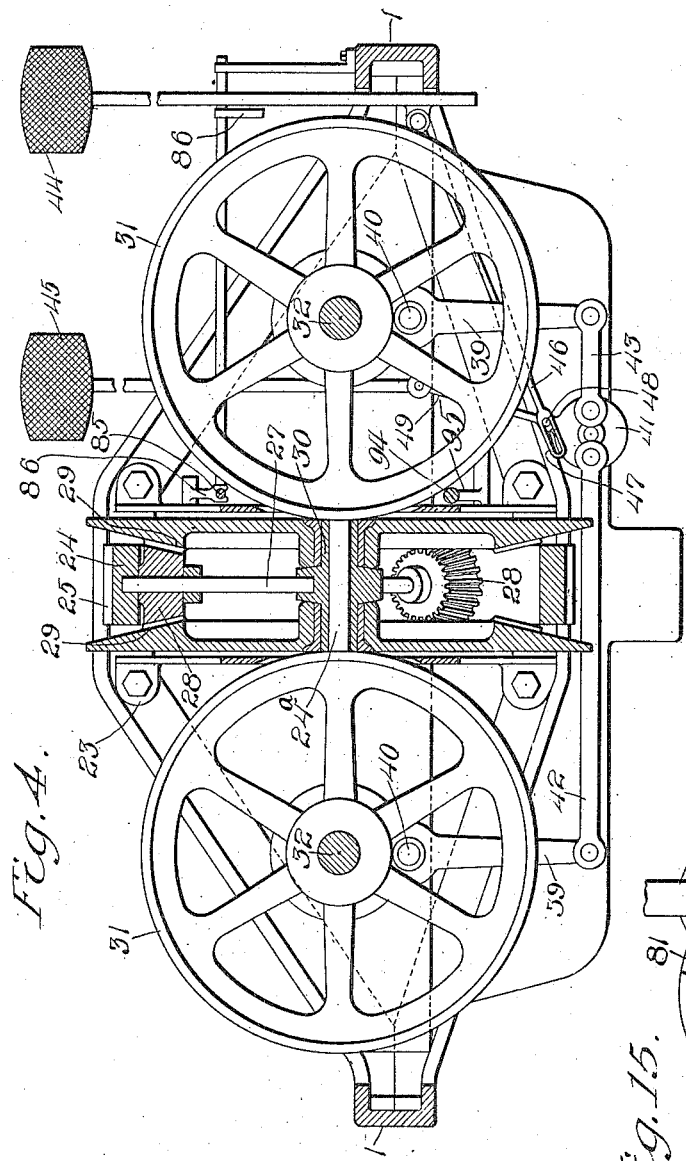

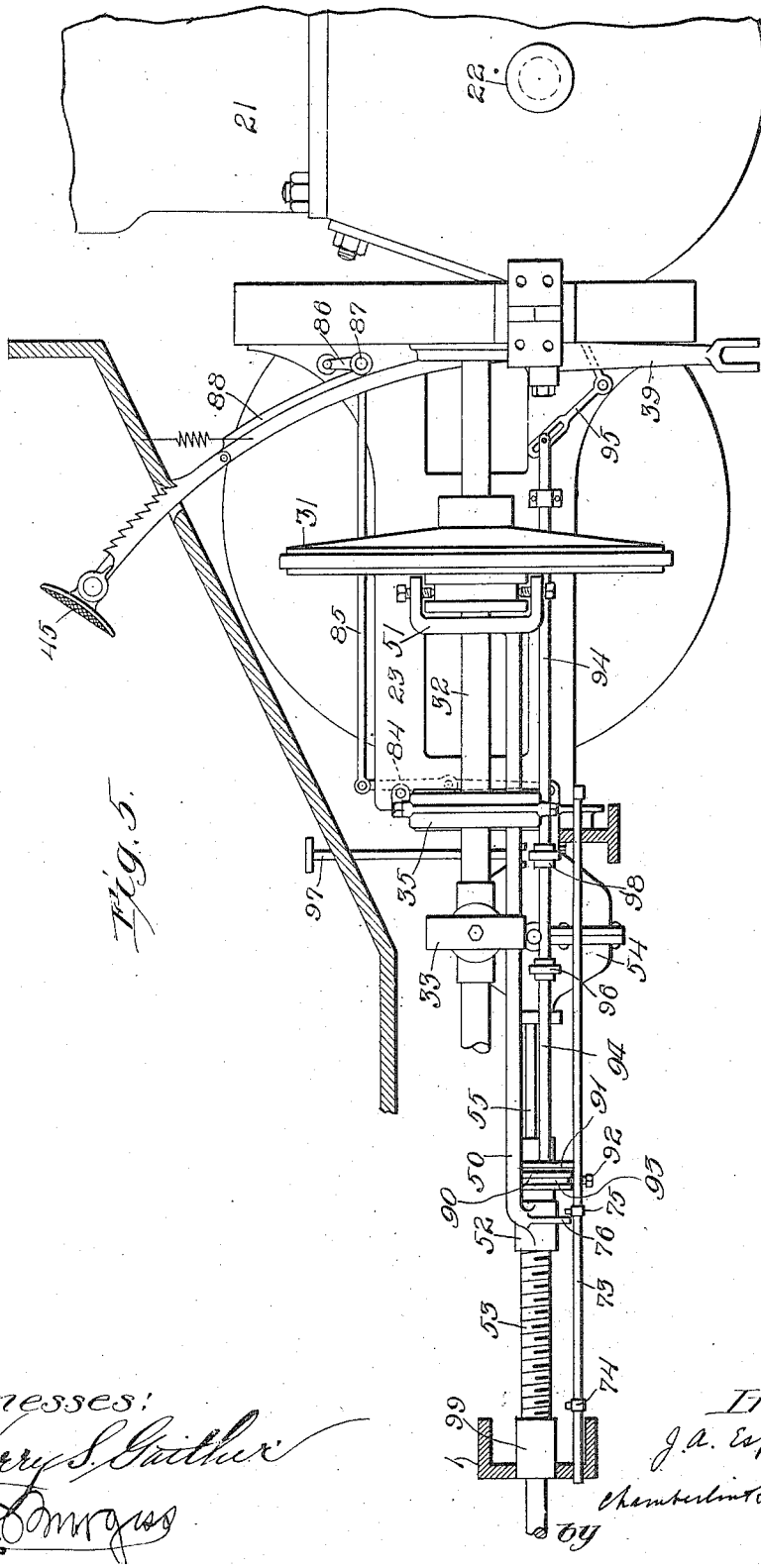

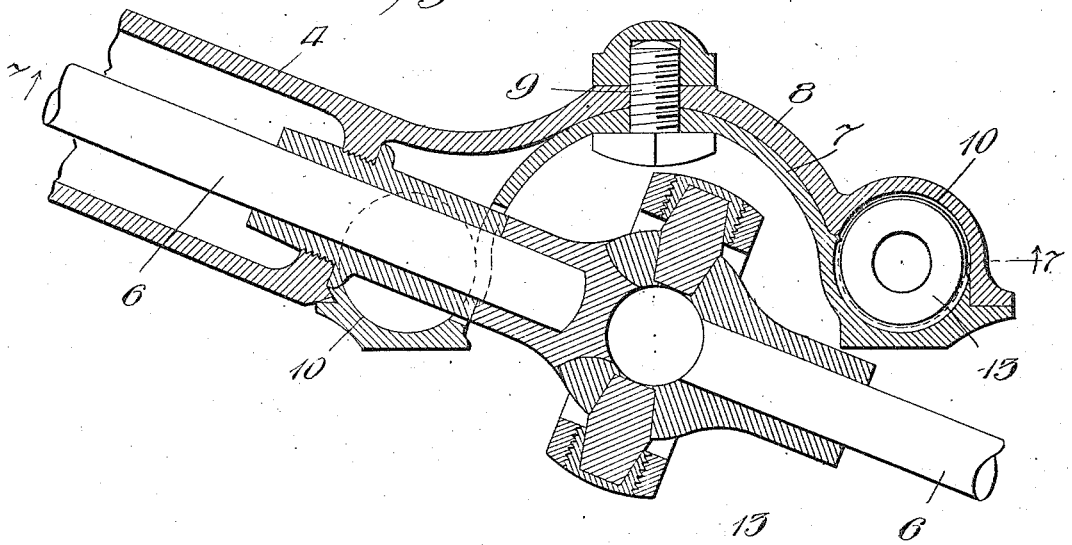
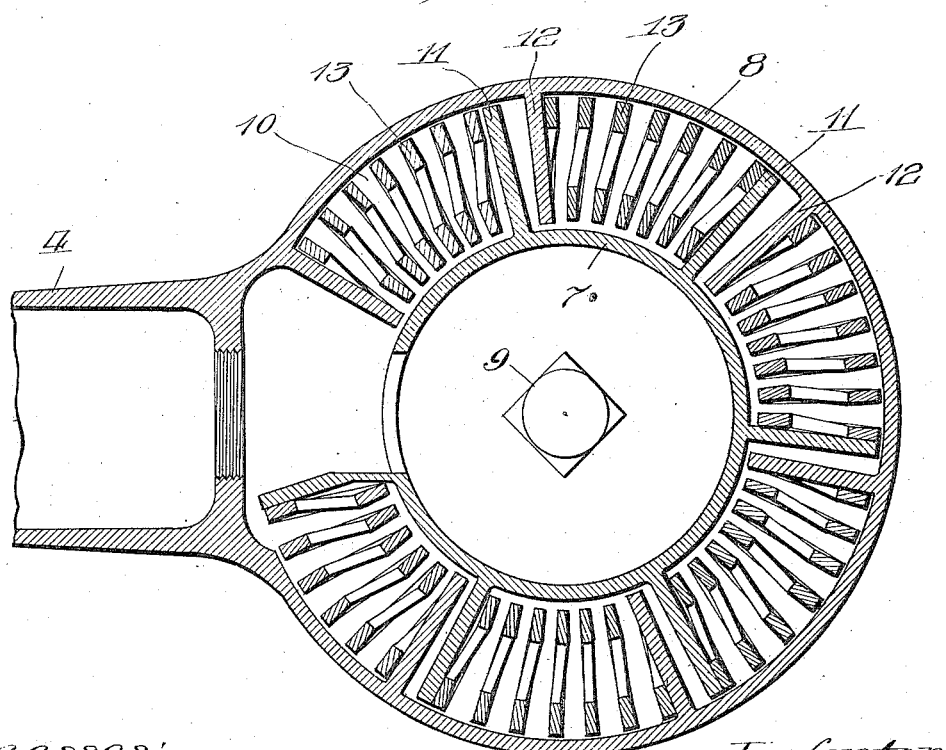

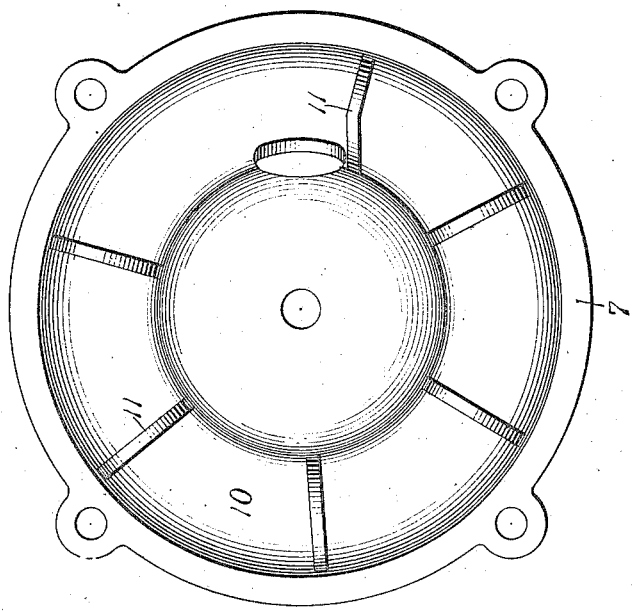
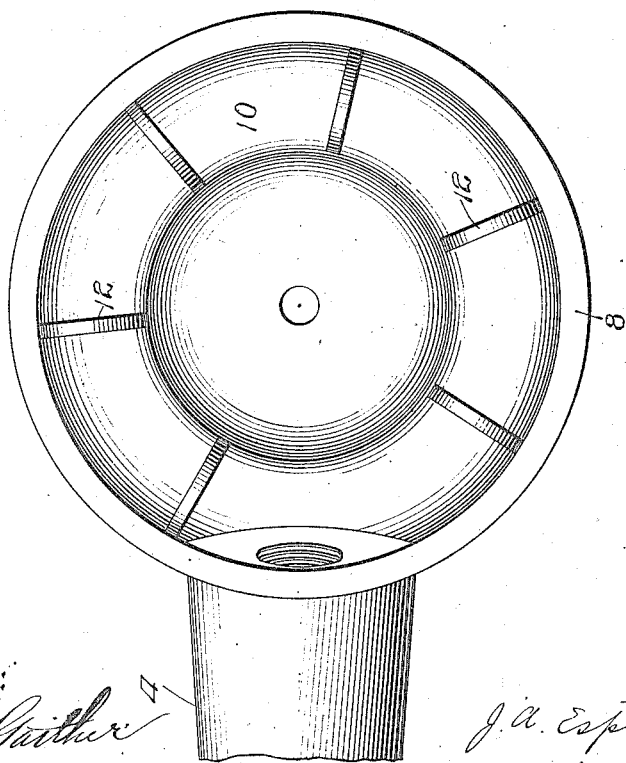

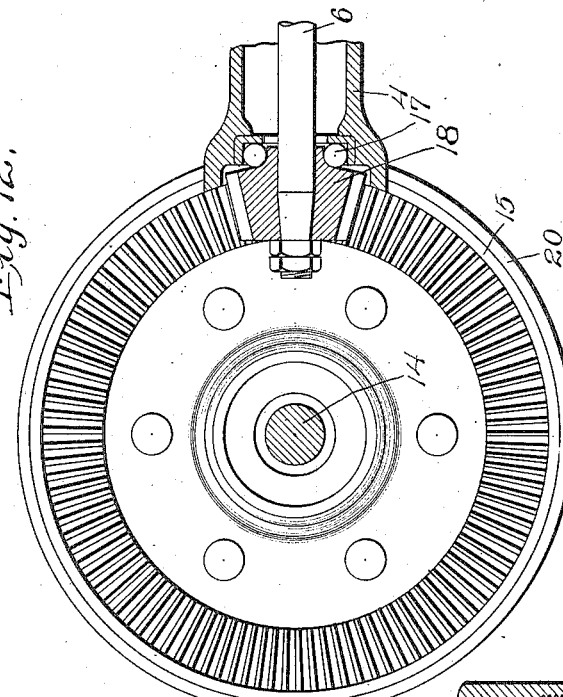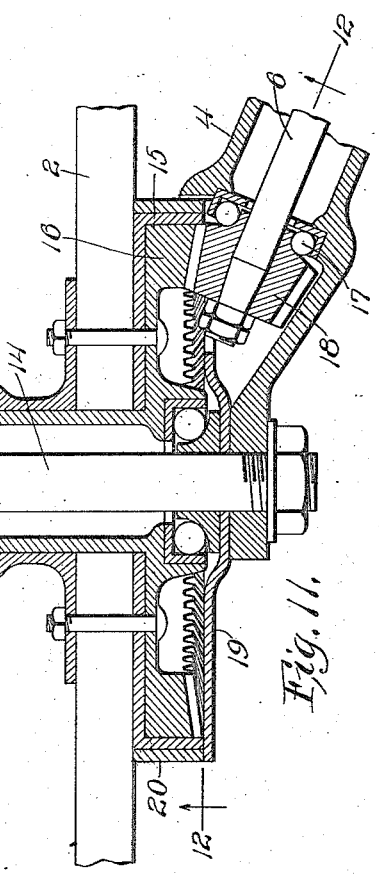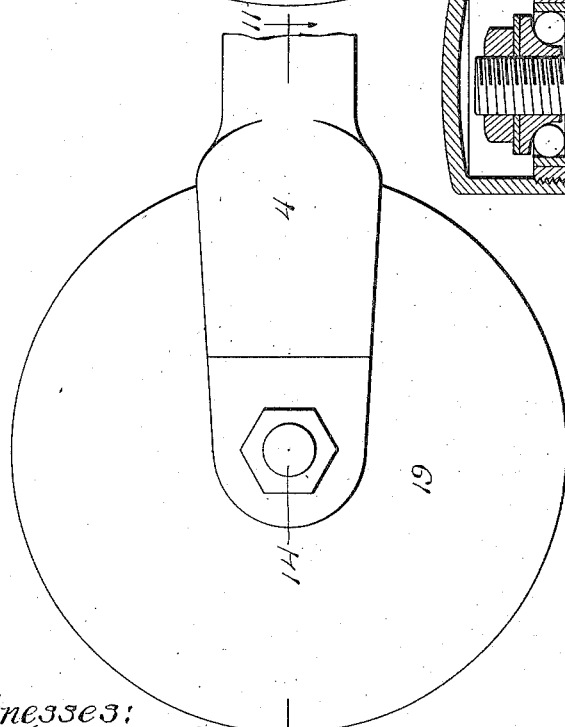

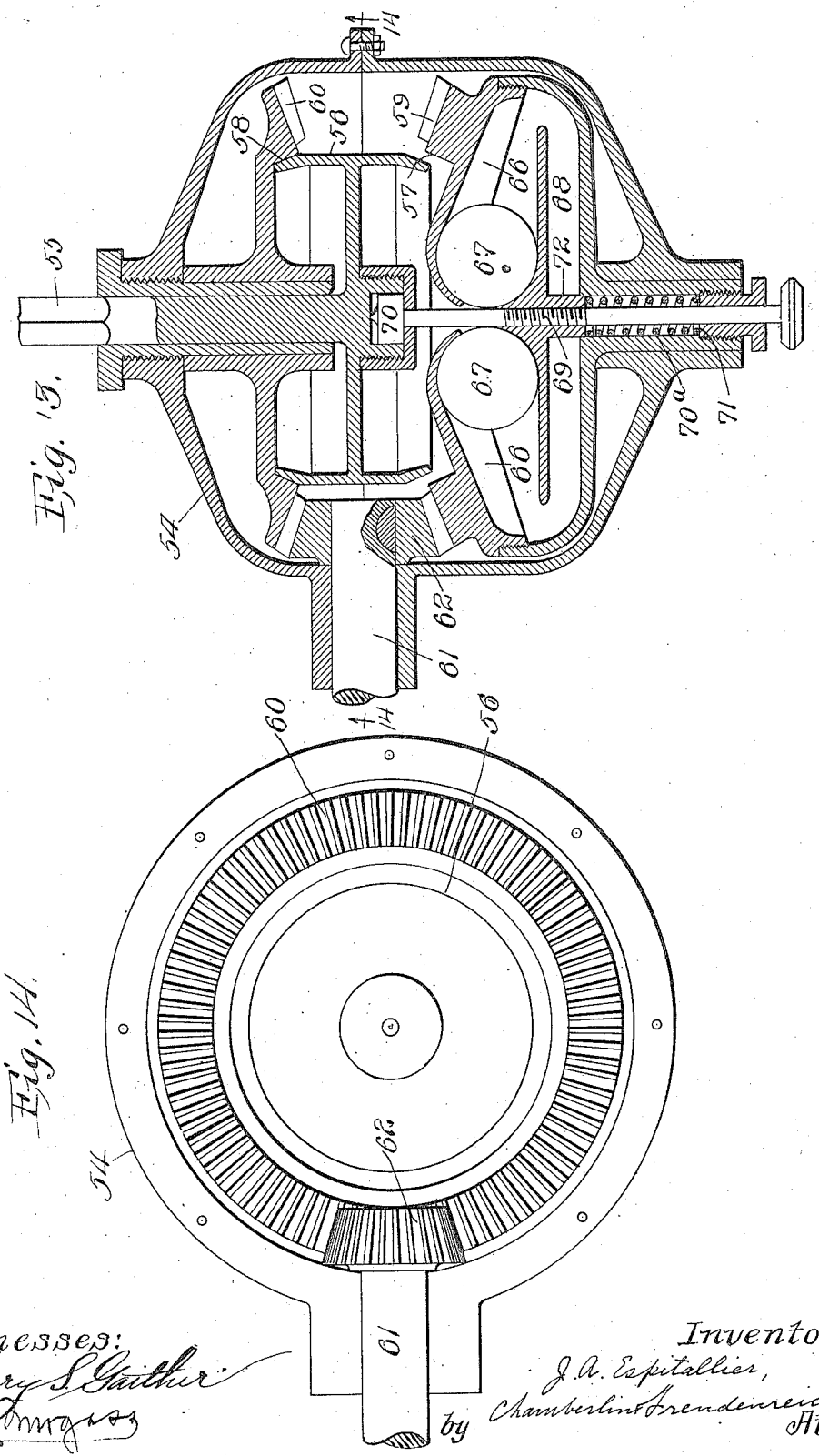

JOHN A. ESPITALLIER, OF CHICAGO, ILLINOIS.

GEARING.

1,192,403.  Specification of Letters Patent.  Patented July 25, 1916.

Application filed September 14, 1911.  Serial No. 649,386.

*To all whom it may concern:*

Be it known that I, JOHN ANDREW ESPITALLIER, a citizen of the United States, residing at Chicago, county of Cook, State of Illinois, have invented a certain new and useful Improvement in Gearing, and declare the following to be a full, clear, and exact description of the same, such as will enable others skilled in the art to which it pertains to make and use the same, reference being had to the accompanying drawings, which form a part of this specification.

My invention has for its object to produce an easily-controlled, light, efficient, smoothly running and durable automobile.

My object is attained by a peculiar construction and organization of the various mechanisms, groups of mechanisms and parts which go to make up an automobile and therefore viewed in various aspects my invention may be regarded: first, as comprising a novel frame structure which dispenses with the usual axles for supporting the wheels; second, as comprising a simple, novel and cheap cushioning means for the body of an automobile; third, as comprising a novel driving mechanism between the motor and the driving wheels; and, fourth, as comprising a novel automatic speed changing and controlling mechanism which produces smooth and gradual changes in the speed of an automobile relative to the speed of the engine to suit the load conditions on the engine, and also the power which is being developed by the engine.

My invention, viewed in other aspects, contemplates various novel structural arrangements which will hereinafter appear from the detailed description of my invention.

In the drawings, in which I have illustrated a single preferred embodiment of the various features of my invention: Figure 1 is a plan view of a complete automobile with the parts above the chassis omitted; Fig. 2 is a plan view on an enlarged scale of the front portion of the chassis; Fig. 3 is a section on line 3—3 of Fig. 2 looking in the direction of the arrows; Fig. 4 is a section approximately on line 4—4 of Fig. 2 looking in the direction of the arrows; Fig. 5 is a section approximately on line 5—5 of Fig. 2; Fig. 6 is a horizontal section on an enlarged scale through the supporting arm for one of the rear wheels at the point where this arm is connected to the frame; Fig. 7 is a section approximately on line 7—7 of Fig. 6, the shaft members and the bearing members for the shafts being omitted; Figs. 8 and 9 are respectively side elevations, looking outwardly, of the two members of the spring box and swivel shown in Fig. 6; Fig. 10 is a side elevation of the supporting members for one of the rear wheels immediately adjacent to the wheel; Fig. 11 is a section on line 11—11 of Fig. 10; Fig. 12 is a section approximately on line 12—12 of Fig. 11; Fig. 13 is a horizontal central section, on an enlarged scale, through the automatic speed governor; Fig. 14 is a section approximately on line 14—14 of Fig. 13; and Figs. 15 and 16 are detail views of a shifting member for the clutch in the automatic governor.

The first feature of my invention which I shall describe is that which relates to the novel support for the wheels and the novel spring arrangement. Referring to Fig. 1 of the drawings, 1 is the main frame of an automobile, 2, 2 are the rear wheels, and 3, 3 are the front wheels. Instead of supporting these two sets of wheels on the ordinary heavy transverse axles, I mount each wheel separately upon one end of an arm which is yieldingly connected at its other end to the frame so as to permit relative cushioned movements between the arms and the frame about horizontal axes. The supporting arms for the rear wheels are indicated at 4, 4 and those for the front wheels at 5, 5. The two rear arms are alike and so also are the two front arms. I propose to use the rear arms as housings for the driving shafts and therefore they may, although not necessarily, have a somewhat different construction from the front arms. The front wheels may be supported upon the free ends of the corresponding arms in any suitable manner which will permit the wheels to rotate and at the same time be shifted about vertical axes for steering purposes. The rear arms are made hollow so as to permit them to be used as housings through which driving shafts, indicated at 6—6 pass.

The connection between the rear arms and the frame is shown in detail in Figs. 6 to 9 and, referring to these figures, it will be seen that on each side of the frame near the rear thereof is fastened a saucer-shaped member 7, the mouth of the saucer being next to the frame. The adjacent end of each of the arms is provided with a similar saucer-shaped portion 8 which is adapted to overlie and fit upon the member 7. The members 7 and 8 are connected together in such a way that they are held against relative movements except rotary movements about a horizontal transverse axis. In the arrangement shown this connection is made by means of a bolt 9 which passes through the members 7 and 8 at their common axis. The rim portions of the two saucer-like members 7 and 8 are so shaped as to form between them an annular passage or chamber 10 which is preferably circular in cross section and, projecting into this chamber from each of the rim portions are radial ears or partitions 11 and 12, respectively. In the arrangement shown there are six of these ribs or partitions and they are spaced equal distances apart so that when the two members 7 and 8 are placed upon each other each of the ribs on one member lies between two of the ribs on the other member. Within the chamber 10 I place a series of springs 13, each spring engaging with one of the partitions on the member 7 and with one of the partitions on the member 8. The springs are preferably placed under an initial tension so that they tend to swing the members 7 and 8 relative to each other as far as they will go, thus bringing adjacent partitions into engagement with each other. The parts are so arranged that when a load is placed upon the wheels the arms tend to turn in the direction to compress the springs. The greater the load, the greater the compression of the springs, and therefore as the automobile runs along the frame is yieldingly supported and therefore rides smoothly. The manner of supporting the front arms is the same as that just described for the rear arms. The driving shafts 6 are divided at a point within the saucer-like member 7 and a suitable universal joint 13, having its center at the pivotal axis of each of the arms 4 connects the two members of each of the driving shafts together.

Power from the driving shafts may be transmitted to the rear wheels in any suitable manner. In the arrangement shown each of the rear wheels is revolubly mounted upon a stub shaft 14 extending outwardly from the outer end of the corresponding supporting arms. On the inside of each wheel may be secured a brake drum 15 having on the inside a bevel gear 16. The rear end of each of the driving shafts is provided with a suitable bearing 17 and carries on its free end a bevel pinion 18 which meshes with the corresponding gear. A plate 19 extending over the open side of the brake drum completes with the drum a housing for the bevel gears. Surrounding the brake drum is a suitable brake band 20. It will thus be seen that when the driving shafts are rotated they transmit their power directly to the rear wheels through the bevel gearing. The universal joints in the driving shaft permits the frame to rise and fall upon the wheels without interfering with the proper driving connection.

I shall now describe the means for operating the driving shafts. Supported upon the front end of the frame is a suitable engine or motor 21 having its crank shaft 22 (see Figs. 1 and 5) extending transversely of the automobile. Arranged on the frame directly in rear of the engine or motor is a combined differential and speed changing mechanism. This mechanism is constructed as follows: Supported in a suitable framework 23 carried by the main frame of the automobile is a spoked wheel 24 mounted so as to revolve about a horizontal axle or shaft 24ª. The rim of this wheel has gear teeth 25 so that the wheel is in fact a large gear wheel. The engine or motor shaft carries a driving gear wheel or pinion 26 in the form of a flywheel (see Fig. 2) which meshes with the teeth on the wheel 24 and revolves this wheel. On each of the spokes 27 of the wheel 24 is revolubly mounted a bevel pinion 28 lying just within the rim. The pinions 28 mesh with two large bevel gears 29 lying on opposite sides of the wheel 24 and revolubly supported on the hub 30 of the latter wheel. Consequently when the wheel 24 revolves, the members 29 also revolve. It will be seen that the wheels 29 need not revolve at the same speed since only the average speed of the two wheels, relative to the speed of the wheel 24 is a fixed factor, and therefore one of the wheels 29 may lag behind the other. This arrangement produces the differential action which permits the two driving shafts and therefore the two rear wheels to run at different speeds. The outer faces of the wheels 29 are finished so as to present friction faces which will enable these wheels to serve as the driving members of a friction drive.

As will best be seen from Figs. 1 to 5, two friction disks 31 are mounted on opposite sides of the differential gearing so as to be revoluble about longitudinal axes, each of the disks being adapted to engage with one of the friction wheels so as to be driven thereby; and, as will hereinafter appear, the friction disks positively actuate the driving shafts 6 and thus transmit the power of the engine to the driving wheels. The friction disks are slidably mounted on shafts 32 which are connected at their rear ends to the corresponding driving shafts 6 by means of universal joints 33. In order to unclutch the driving shafts from and clutch them to the engine I prefer to provide means for moving the friction disks out of and into engagement with the friction wheels, this being conveniently accomplished by mounting the supporting shafts for the disks in such a manner that the shafts may be swung from and toward the friction wheels. In the arrangement shown, (see Fig. 6) the rear bearings 34 for the shafts 32 are supported in yokes 35 which are in turn secured to the frame member 23 by means of brackets 36 or other suitable means; the bearings 34 being held between pivots or centers 37 and 38 arranged respectively above and below the bearings so as to permit the bearings as a whole to swing about vertical axes. The front ends of the shaft 32 are mounted in such a manner that they may be swung laterally about the vertical pivotal axes at the rear ends, this swinging movement of the shafts being sufficient to carry the friction disks out of engagement with the driving wheels. In the arrangement shown, (see particularly Fig. 4) the bearings for the front ends of the shafts 32 are in the upper ends of the rockers 39 which are pivotally supported at intermediate points upon the frame of the machine as indicated at 40. Between the lower ends of the rockers is a disk or crank member 41 mounted upon the frame of the machine so as to be rotatable about a longitudinal axis. Links 42 and 43 extend from this disk to the lower ends of the members 39, each being pivotally connected at one end to the disk and at the other end to the corresponding rocker. It will be seen that by turning this disk the rockers will be swung about their axes and the shafts 32 will be swung away from or toward the friction wheels, depending upon the direction in which the disk is moved.

In the arrangement shown I have provided two foot levers 44 and 45 which, as will hereinafter appear, serve to clutch and unclutch the driving shafts from the engine, reverse the direction of movement of the automobile and apply the brakes, the entire control being through these two levers. The levers are intended to have an up and down movement which may either be rectilinear or in the arc of a circle depending upon the shape which is given to the levers. Pivotally connected to the lower end of the lever 44 is a thrust rod 46 which extends over into proximity to the disk 41 and is there provided with a fork 47 which straddles a pin 48 near the periphery of the disk. It will be seen that when the lever 44 is depressed it will cause the forked end of the thrust rod to move laterally and therefore will turn the disk through a predetermined angle, swinging the shafts 32 outwardly and bringing the friction disks clear of the driving wheels. When pressure upon the lever is removed the parts return to their normal positions, with the friction disks in operative engagement with the driving members. This lever may be connected to the brakes in any usual way (not shown) so that when it is depressed it first unclutches the driving wheels from the engine and then applies the brakes. The lever 45 is provided with a thrust rod 49 similar to the thrust rod 46 and pivotally connected at its ends to the member 45 and to the disk. The lever 45 is placed more directly over the disk than is the lever 44 and therefore the thrust rod 49 is more nearly vertical than the thrust rod 46 and a greater turning movement of the disk results from a depression of the lever 45 than from a depression of the lever 44. The lever 45 is for the purpose of reversing the direction of travel as will hereinafter appear.

The methods now in vogue of controlling the speed of automobiles all have the disadvantage that it is left entirely to the operator as to when and how the speed shall be changed. This permits the operator to increase the speed at times when this should not be done and when an injury to the mechanism or at least annoyance to the occupants may result from a change of speed.

It is the purpose of my invention to provide means for automatically increasing the speed of the driving shaft relative to that of the motor when the automobile starts so as to bring about a gradual increase in speed as rapidly as the particular running conditions at the time permit, and thereafter control the speed of the driving shaft relative to the engine in accordance with the load on the engine and the power which is being developed by the engine. I accomplish this by providing automatic actuating means for sliding the friction disks back and forth toward and away from the axis of rotation of the friction wheels. To this end I have provided a long U-shaped member 50 which has the free ends of its arms connected to the two friction disks in any suitable manner as indicated at 51 so as to permit the disks to rotate about their axes but prevent relative movements between the members 50 and the disks in the direction of the axes of the disks. The rear end or yoke portion 52 of the U-shaped member is provided with a screw-threaded opening therethrough for receiving a screw-threaded shaft 53. When the shaft 53 is rotated in one direction or the other it moves the U-shaped member and with it the two friction disks so as to carry them toward or away from the center of the driving wheels, depending upon the direction of rotation of the screw. The screw is controlled by several different devices, the principal one of which is an automatic governor. Referring to Figs. 2, 13 and 14 of the drawings, it will be seen that just in rear of the differential mechanism is mounted a casing 54 into the rear end of which projects a squared shaft 55. The shaft 55 is telescoped within the shaft 53 so that the two must rotate together but have freedom of relative axial movements. At a point within the casing 54 is a two-faced clutch member 56 rigidly connected to the inner end of the shaft 55. In front of the member 56 is a coöperating driving clutch member 57 and behind the member 56 is a second driving clutch member 58. The members 57 and 58 have thereon bevel gears indicated at 59 and 60 respectively. Into the side of the casing 54 projects a shaft 61 which carries on its inner end a bevel pinion 62 meshing with both of the bevel gears 59 and 60. The bevel gears 59 and 60 lie on opposite sides of the pinion and therefore when the pinion revolves these gears are driven in opposite directions. The shaft 61 is driven in any suitable way directly from the engine or motor. In the arrangement shown there is a sprocket chain 63 which passes over sprocket wheels 64 and 65 placed respectively on the engine shaft and on the shaft 61. Consequently whenever the engine is running the two clutch members 57 and 58 are being driven. If then the movable clutch member 56 is brought into engagement with the clutch member 57, the screw 53 is revolved in one direction, namely the direction to carry the yoke 50 toward the rear of the machine and the friction disks away from the center of the driving wheels. If, on the other hand, the clutch member 56 is brought into engagement with the clutch member 58, the screw 53 will be turned in the opposite direction and the disks will be moved toward the center of the driving wheels. By this means the speed at which the automobile is driven may either be increased or decreased.

In starting an automobile it is of course customary to start on the lowest speed and then increase the speed through various gear changes. In all arrangements where the speed changing mechanism consists of a series of gears, there can be no gradual increase or decrease in the speed, but changes must be effected by means of two or three abrupt steps. Where the control of the speed governing mechanism is entirely manual it may happen that the speed is increased too rapidly to suit the particular conditions existing at the time of starting or it may happen that time is lost because the speed is not increased rapidly enough. To overcome these objections I make the speed control automatic by providing a suitable governor for shifting the clutch member 56 into engagement with the member 57 after the engine has reached a predetermined speed. Consequently, starting at the lowest speed, no increase is made unless and until there is sufficient power in the engine to bring it up to a predetermined speed under the load which it is carrying. Furthermore, if the load becomes too great for the engine at any time before the maximum speed is reached, the governor will act to arrest the progress of the speed changing mechanism until the engine again picks up speed.

The details of the governing mechanism may be greatly varied, but for the sake of brevity I have illustrated only a single arrangement which I believe to be the preferred form. Referring to Fig. 13 of the drawing, it will be seen that the clutch member 57 is peculiarly shaped on the side toward the front of the automobile, there being a series of inclined channels 66 arranged at an acute angle to the axis of rotation and forming ways for a series of balls 67. The balls rest upon a flat disk-like table 68 which is fixed to a stem 69. One end of the stem is connected to the clutch member 56 in such a way that the two may rotate relative to each other about their common axis but are held against relative movements in the axial direction, this connection being indicated at 70. The other end of the stem extends out through the front of the casing and is surrounded by a spring 70ª which rests at one end upon a shoulder 71 in the casing and at the other end against a hub 72 on the table 68. The parts are so proportioned that normally the spring holds the clutch member 56 in engagement with the clutch member 58. Consequently whenever the engine is running below a predetermined speed the governing mechanism acts or tends to act to carry the friction disks toward the center of the driving wheels. However, when the engine attains a certain speed the balls 67 move outwardly along the inclined passages and force the table 68 forward until the clutch member 56 is carried out of engagement with the member 58. Then as the speed of the engine increases the balls fly out to the limit of their movement and the member 56 is clutched to the member 57. The screw 53 now begins to turn in the direction to carry the friction disks away from the center of the driving wheels, so that the speed of the automobile is gradually increased. If the load on the engine becomes too great the balls of the governor travel toward the center and leave the member 56 clear of both of the coöperating clutch members so that the speed of the automobile relative to that of the engine remains unvaried. If the speed of the engine drops still more the governor balls pass to the inward limits of their movement and the clutch member 56 is brought into operative relation to the member 58 and the friction disks will begin to travel toward the center of the driving wheels. This will keep up until the engine is able to carry the load and then the speed-controlling clutch will first be brought into a neutral position and then, if conditions warrant, into a position to gradually increase the speed of the automobile. It will thus be seen that the control of the speed is not only automatic but it is sensitive to every change in the load condition and speed condition of the motor and therefore, by properly adjusting the parts initially to suit a given automobile, the most efficient results as to speed both in starting and during the running operation will be obtained automatically and without any attention or care on the part of the driver.

Since the speed controlling screw is actuated automatically some means must be provided for preventing the friction disks from being moved too far in either direction. I have therefore provided an automatic limit device which arrests the feed of the friction disks before they have gone too far in either direction. In the arrangement shown I have accomplished this in the following manner. Referring particularly to Figs. 2, 5, 13 and 15 and 16, it will be seen that running parallel with the governing screw and adjacent thereto is a rod 73 suitably mounted in bearings so as to be rotatable about its axis. This rod is provided with two cam stop pieces 74 and 75 secured thereto and preferably adjustable thereon. On the actuating yoke for the friction disks is a lug or finger 76 which lies between the cams 74 and 75 and in line therewith. When the yoke moves forward it engages with the cam 75 and therefore turns the rod 73 in the clockwise direction, as viewed from the front. When the yoke nears the limit of its backward movement it engages with the cam 74 and turns the rod in the opposite direction. The front end of the rod is connected with the stem 69 of the governor in any suitable way so that the rod in its movements controls the clutch. Thus when the rod is turned in the clockwise direction it draws the stem forward and brings the clutch member 56 into a neutral position and out of engagement with the clutch member 58 so that further feeding of the friction disks toward the center of the driving members is prevented. Similarly, whenever the rod 76 turns in the other direction it moves the clutch member 56 away from the member 57 and into a neutral position so as to stop the outward feeding of the friction disks. The movement of the rod is not enough to cause the clutch connection to be completely reversed, being only great enough to interrupt the action of the clutch. The connection between the rod 73 and the stem 69 is most clearly shown in Figs. 15 and 16. It will be seen that the stem 69 has on its end a small wheel 78 which is beveled in both directions at its periphery. On the rod 73 are two arms 79 and 80, whose ends lie far enough apart to receive between them the wheel 78, the ends being beveled as indicated at 81 and 82 so as to have the same angle as the bevels on the wheel. Furthermore, the arms are so shaped that one engages one of the bevels, thus lying behind the wheel, and the other engages the other bevel, lying in front of the wheel. When the rod 73 is oscillated back and forth this connection between it and the stem permits it to reciprocate the stem back and forth. This arrangement does not interfere with the operation of the ball governor because the stem 69 may move back and forth under the action of the governor, producing a rotation of the rod during such movements, by reason of the beveled faces on the arms and on the wheel with which they engage. This arrangement also permits the stem to be moved manually if desired. Such a manual movement may be necessary when it is desired to reverse the direction of movement of the automobile. From the description heretofore given it will be evident that when the foot lever 44 is depressed so as to unclutch the rear wheels of the automobile from the engine, the engine as it slows down will actuate the friction disks so as to feed them toward the center. If it should happen that the engine stops before approximately the center is reached, the arrangement which I shall hereinafter describe for reversing may necessitate a manual actuation of the stem 69 so as to complete the feeding of the friction disks toward the center. Such a means for manually operating the clutch controlling stem is illustrated in Figs. 2, 4, 5 and 16 and it consists of a lever 84 which is pivoted to the frame 23 intermediate the ends of the lever at a point in front of the stem so that the lower end of the lever moves in a path which will bring it into engagement with the stem when the lever is oscillated. To the upper end of the lever 84 is secured a connecting rod 85 which extends to the front of the machine and is there suitably connected to the reversing lever or pedal 45 so that when the latter is actuated the lever is oscillated in the direction to bring the movable clutch member 56 into engagement with the member 58; thus causing the friction disks to travel to the center if they are not already there. The connection between the rod 85 and the foot lever 45 may conveniently be as follows: The front end of the rod 85 is connected to a hanger 86 which is pivotally supported on the frame-work in front of the member 45. On the hanger is a roller 87 which lies in the path of a cam 88 on the front face of the foot lever. When the lever is depressed the cam engages with the roller and draws the connecting rod forward and when the lever is again released the cam passes out from under the roller and leaves the connecting rod free. If desired a connection from the hanger 86 may extend into proximity to the foot lever 44 so as to insure that the friction disks will always be at the center when starting.

There remains only one feature of the reversing mechanism to be described. Reversal is effected by carrying the friction disks past the center to the side of the driving members opposite to that on which they lie during forward movement of the vehicle. In order to carry the friction disks past the center I have provided means for shifting the screw 53 lengthwise at the time of reversing, the movement of the screw being enough to carry the feeding yoke and the disks the desired distance. This I accomplish by securing upon the screw a grooved collar 90 which is embraced by a fork 91 having suitable pins 92 lying in the groove 93 of the collar. The fork is carried upon the rear end of a rod or bar 94 extending longitudinally of the vehicle and mounted on the frame-work so as to be slidable in the longitudinal direction. The front end of the member 94 is connected to one arm of a bell-crank lever 95 the other arm of which lies below the lower end of the foot lever 45. When this foot lever is depressed it first throws the friction disks out of engagement with their coöperating members and places the governor in a position to feed the friction disks forward, and then, by engaging with the bell-crank lever 95 carries the rod 94 forward and with it the feed screw, the yoke and the friction disks until the friction disks are carried past the center far enough to give a slow reverse speed. Upon the release of the reversing lever there is nothing to prevent the disks from moving back in the direction from which they came and therefore I have provided the rod 94 with a collar 96 which lies directly beneath the lower end of a forked plunger 97 when the rod 94 is at the forward limit of its movement. By dropping the plunger down over the collar 96 the rod will be locked in place until it is desired again to move in the forward direction. If desired, a second collar 98, similar to the collar 96, may be arranged on the rod at such a point that it will lie directly beneath the plunger when the automobile is running in the forward direction. Consequently, by dropping the plunger down upon the collar 98, accidental displacement of the rod will be prevented. The movement of the controlling screw in the longitudinal direction is permitted by reason of the sliding connection between it and the squared shaft 55 and an elongated sliding bearing 99 in the frame-work at the rear end of the screw.

While I have illustrated and described only a single preferred form of my invention, I do not desire to be limited to the particular structural details thus illustrated and described; but intend to cover all forms and arrangements which fall within the terms employed in the definitions of my invention constituting the appended claims.

I claim:

1. In combination, a motor, a driven member, a speed-changing driving mechanism between said motor and said member, and automatic governing means constructed and arranged gradually to increase the speed of the driven member relative to that of the motor when the motor reaches a predetermined speed and irrespective of any subsequent increase in the speed of the motor.

2. In combination, a motor, a driven member, a speed-changing driving mechanism between said motor and said member, means for gradually shifting said speed-changing mechanism, and means governed by the speed of the motor for automatically setting the aforesaid means in operation when the motor reaches a predetermined speed.

3. In combination, a motor, a driven member, a speed-changing driving mechanism between said motor and said member, and means governed by the speed of the motor for automatically shifting said mechanism from the lowest speed to the highest speed when the motor reaches and maintains the predetermined speed.

4. In combination, a motor, a driven member, a speed-changing driving mechanism between said motor and said member, an actuator for said mechanism, and a reversing driving mechanism for said actuator governed by the speed of the motor.

In testimony whereof, I sign this specification in the presence of two witnesses.

J. A. ESPITALLIER.

Witnesses:
WM. F. FREUDENREICH,
HARRY S. GAITHER.